UNITED STATES PATENT OFFICE.

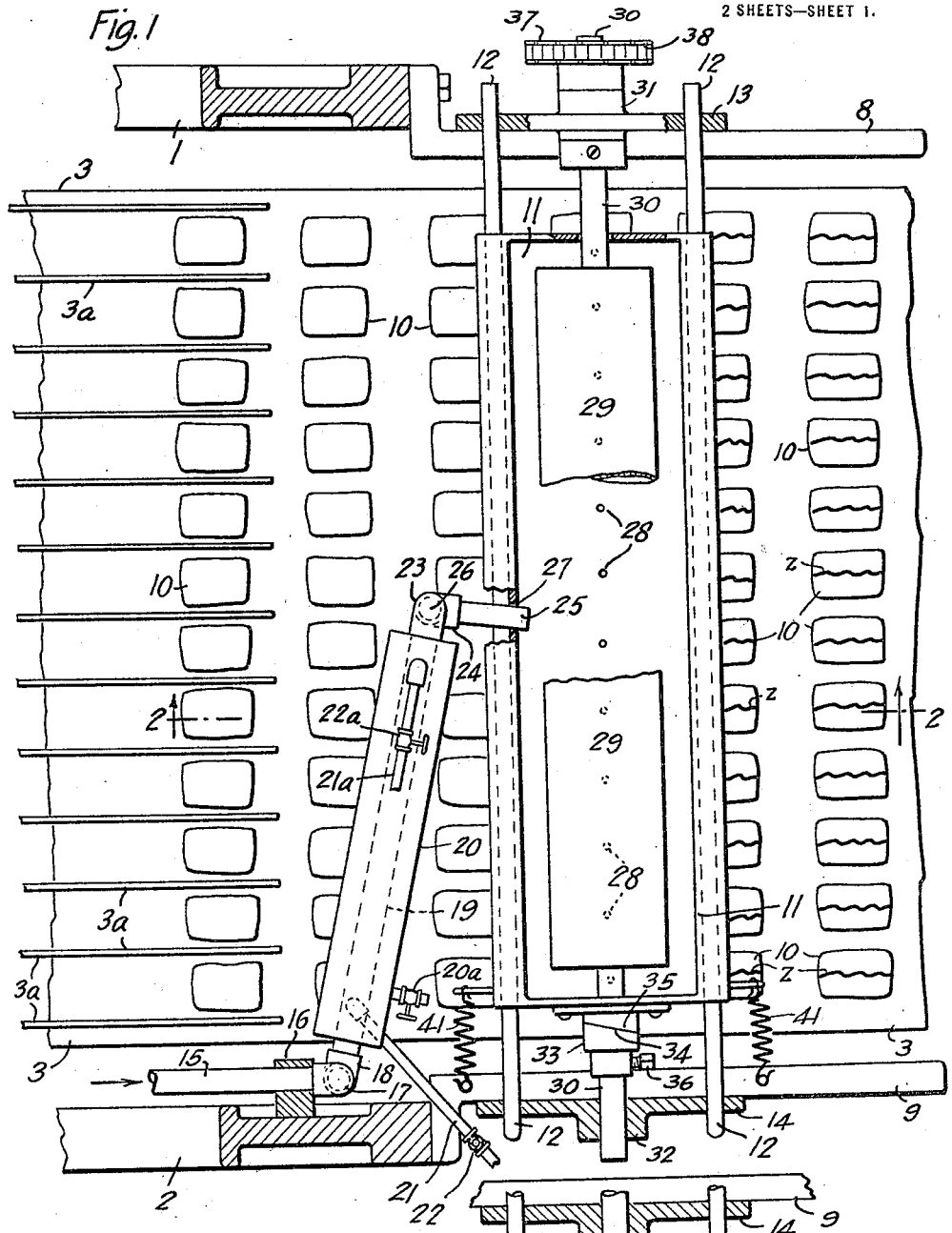
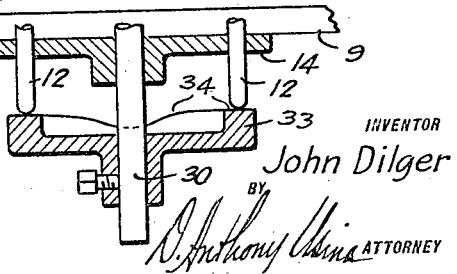

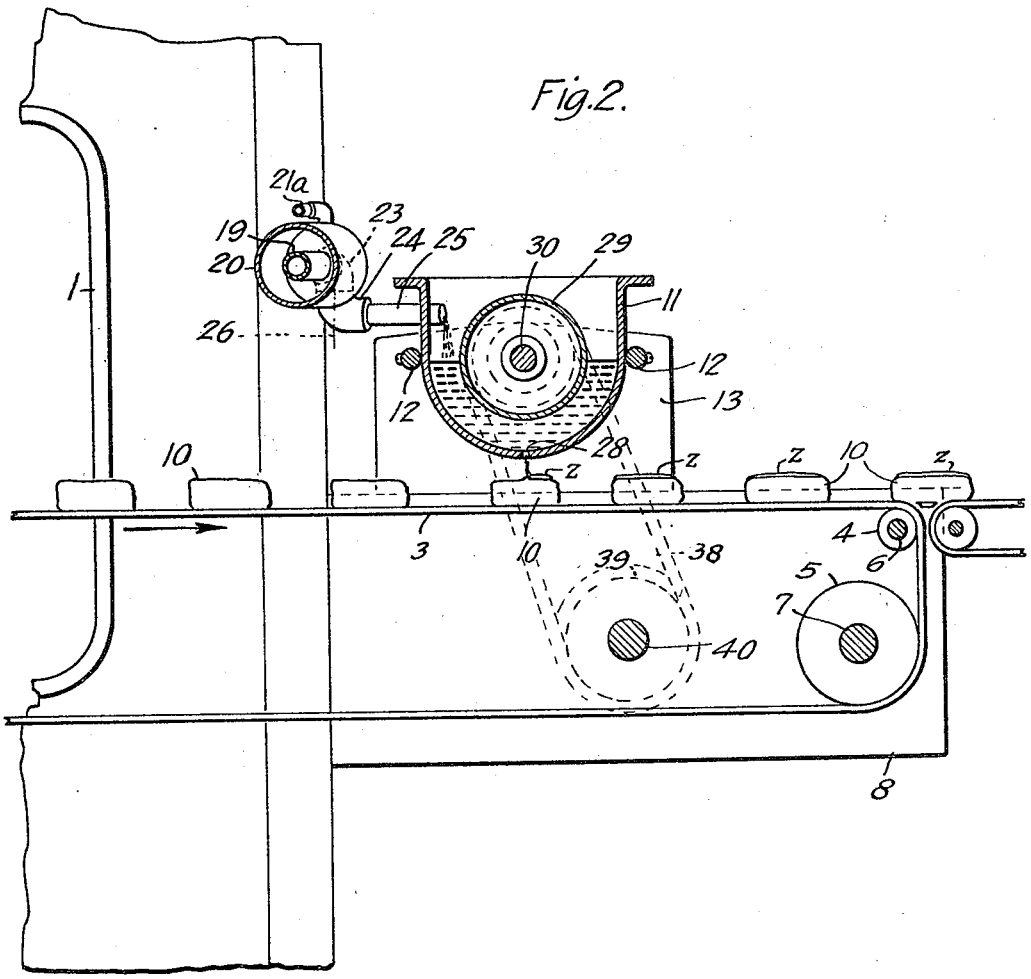
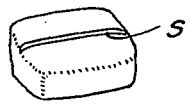
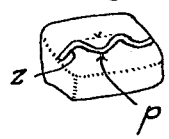
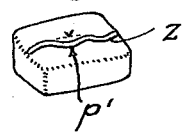
INVENTOR
John Dilger

JOHN DILGER, OF LYNDHURST, NEW JERSEY.

CANDY-STRINGING MACHINE.

1,402,287.  Specification of Letters Patent.  Patented Jan. 3, 1922.

Application filed September 11, 1920. Serial No. 409,537.

*To all whom it may concern:*

Be it known that I, JOHN DILGER, a citizen of the United States, and resident of Lyndhurst, New Jersey, have invented certain new and useful Improvements in Candy-Stringing Machines, of which the following is a specification.

This invention relates to machines for depositing a small line of plastic material on the top of a candy to interrupt the surface thereof to improve the appearance of such confections and give them the appearance of hand-made candies.

The objects and advantages of the invention will be apparent in the following specification and claims when read in connection with the accompanying drawings.

Fig. 1 is a plan view of my improved attachment mounted on the frame of a typical form of candy coating or enrobing machine;

Fig. 2 is a vertical section view thereof on the line 2—2 of Fig. 1;

Fig. 3 is a detail illustrating a modification;

Figs. 4, 5 and 6 illustrate candies which have been decorated by stringing them by means of my improved attachment.

In the drawings 1 and 2 represent the side frames of a typical form of candy coating or enrobing machine. Such machines are of well known construction and are, therefore, not illustrated and described in detail in this application.

These machines are provided with a belt conveyor 3 guided at the discharge end on rollers 4 and 5 carried by shafts 6 and 7 respectively which are journalled in suitable bearings in brackets 8 and 9 carried by the side frames of the coating machine. The candies 10, as they pass through the enrobing machine, are coated with a layer of plastic material such as chocolate; the belt 3 passing under certain apparatus in the coating machine which deposits a thin layer of chocolate on the core of the candy fed to the machine. The coating applied is of substantially uniform thickness and gives the confection a perfectly smooth and even appearance which enables one to easily detect that the confection is a machine made one.

My improved attachment provides means for depositing a rib or string of plastic chocolate or other suitable material on the top of the candy before it is discharged from the coating machine. The molten chocolate for supplying this string of material is carried in a trough-shaped receptacle 11 which is secured to transversely extending rods 12—12 which rods are slidably mounted in brackets 13 and 14 secured to the brackets 8 and 9 above referred to. The semi-liquid chocolate or other suitable stringing material is supplied through a pipe 15 which is connected to a heated reservoir, not shown, forming part of the equipment of the coating machine. This pipe is supported by a bracket 16 and carries on its end an elbow 17 which engages a similar fitting 18 carried by a pipe 19 extending through a steam jacket 20. Steam is supplied to the jacket 20 through a pipe 21 having a suitable control valve 22 carried thereby.

In addition to the steam supply 21, I also provide a cold water supply pipe $21^a$ having a control valve $22^a$ connected thereto. This arrangement provides means whereby both a heating and cooling medium may be introduced into the jacket 20 so as to accurately control the temperature at which the stringing material is discharged from the pipe 25 into the receptacle 11; the jacket 20 being provided with a valve controlled outlet pipe $20^a$ for discharging either cold water or steam. This jacketed arrangement obviates the necessity of having any heating device carried by the receptacle 11 which in most instances is a movable member and, therefore, said receptacle can be made of much lighter weight thereby cutting down the amount of power necessary to operate it and materially reducing the manufacturing cost thereof.

The pipe 19, surrounded by the jacket 20, is provided at one end with a downwardly extending elbow 23 which is in pivotal threaded engagement with a similar elbow 24 so that the pipe 25 extending from the elbow 24 can oscillate about the vertical axis 26 of the elbow 23. The pipe 25 projects through an opening 27 formed in the side wall of the trough-shaped member 11.

The trough-shaped member 11 is provided with a row of apertures 28 through which the molten chocolate flows as the candies on the conveyor belt 3 travel beneath these apertures. This member is provided with a mixing roller 29 carried by a shaft 30 mounted in fixed bearings 31 and 32 in the brackets 13 and 14. This roller 29 is employed to act as an agitator to keep the chocolate in the receptacle 11 in a uniformly semi-liquid condition, and to aid in forcing this semi-liquid fluid through the apertures 28.

The conveyor belt 3 carries the candies 10 under the apertures in the receptacle 11 so that a separate string of chocolate is deposited on top of each candy. Longitudinally extending guides 3ª are mounted above the conveyor belt and are adapted to assist in initially positioning the candies in a definite lateral spaced relationship with one another. The spacing of the apertures 28 is substantially equal to the distance on centers between adjacent guides 3ª, therefore the number of apertures in the receptacle 11 corresponds to the number of candies in a single transverse row on the conveyor belt.

The attachment may be used either to deposit a straight string $s$ on the candy, as shown in Fig. 4, or a zig-zag string $z$, as shown in Figs. 5 and 6. When the straight string is to be formed, the trough-shaped receptacle 11 remains stationary and the movement of the candy 10 permits the chocolate dripping from the apertures 28 to be deposited in a substantially straight line as shown in Fig. 4. When an irregular string $z$ is to be formed as shown in Figs. 5 and 6, the receptacle 11 is given a slight reciprocating motion so that the compound movement between the longitudinally moving conveyor belt 3 and the transversely reciprocating receptacle 11 results in depositing the string in a zig-zag formation as shown in Figs. 5 and 6. For effecting the transverse movement of the receptacle 11, I employ a cam 33 having a face 34 which co-operates with a similar face on a member 35 secured to the end wall of the receptacle 11, as shown in Fig. 1. The cam 33 is secured to the shaft 30 by means of a set screw 36. The shaft 30 carries on its outer end a sprocket 37 which is driven by a chain 38 passing over a sprocket 39 carried by a shaft 40 which receives its drive from the main coating machine.

From the above it will be seen that as the shaft 30 revolves the inclined cam 34 will reciprocate the receptacle 11, springs 41 being employed normally keep the cam 33 and member 35 in proper operative engagement. The cam 33 shown in Fig. 1 is shaped so as to form a zig-zag string of comparatively coarse pitch, for example, one similar to Fig. 5 in which the distance $p$ between the peaks of the zig-zag string is greater than the distance $p'$ between the similar peaks in the string shown in Fig. 6. For getting these different results it is only necessary to loosen the set screw 36 and remove the cam 33 from the shaft 30 and substitute in its place one having a cam face 34 so proportioned that it will have a shorter stroke. When it is desired to finish the candies with a straight string, as shown in Fig. 3, it is merely necessary to loosen the set screw 36 and slide the cam 33 outwardly on the shaft 30, it being understood that the springs 41 at this time are disengaged.

As illustrated in Figs. 1 and 2 the cam 33 for reciprocating the receptacle 11 is located between the receptacle and the bracket 14 and in order to change this cam it is necessary to slip the shaft 30 endwise to remove the cam to effect such a change. I may, however, mount a cam on the outer end of the shaft 30, as shown in Fig. 3, so that its cam face 34 will co-operate with the rounded ends of the supporting rods 12. With such a construction it is not necessary to remove the shaft in order to effect a change of stroke of the receptacle 11, to vary the designs of the decorative string on the candy. And when it is desired to make straight strings on the candies this cam can be loosened and withdrawn a sufficient distance to be out of the path of the rounded ends of the supporting rods 12, the springs 41 at such time being disengaged.

From the above description it will be readily seen that the candies 10 in any transverse row on the conveyor belt 3 will be simultaneously brought underneath the transverse row of apertures 28 in the receptacle 11, where the semi-liquid stringing material flowing out of said apertures is deposited thereon to form various decorations. For example, the cam 33 may be employed to give a zig-zag string of comparatively coarse pitch between the peaks of the zigzag, as shown in Fig. 5, or a different cam may be employed to give a zig-zag string of smaller pitch, as shown in Fig. 6, or if desired the use of such cams can be dispensed with entirely and the string will be deposited in substantially a straight line as the candies move longitudinally beneath the apertures 28 in the receptacle.

This apparatus is an improvement over similar devices in that it is exceptionally light in construction, thereby requiring less power to operate, it is so designed that it is unnecessary to provide a hot water jacket or other heating means on the movable receptacle. Most of the parts are made of sheet metal, standard pipe and stock steel rods so that the cost of manufacture is very low. The design is such that it can readily be applied as an attachment to standard types of candy coating machines without making any elaborate alterations thereto and the construction is such that the parts are all easily accessible for examination or repair, if necessary.

Though I have described with great particularity the specific construction of the embodiment shown, it is not to be inferred that I am limited thereto, as changes in arrangement and substitution of mechanical equivalents may be made by those skilled in the art without departing from the invention as defined in the subjoined claims.

What I claim is:

1. A machine of the class described, including in combination, a conveyor for candies, a stringing attachment including a receptacle of thin cross section extending transversely across the top of said conveyor and having a row of apertures in the bottom thereof for discharging the stringing material onto the candies carried by the conveyor, an agitator in said receptacle to assist in preventing the stringing material from congealing, a shaft for said agitator and means carried by said shaft for moving the receptacle at an angle to the direction of travel of the candies carried on said conveyor.

2. A machine of the class described, including in combination, a conveyor for candies, a stringing attachment including an elongated trough like receptacle for the stringing material movable transversely above said conveyor, and having a plurality of apertures therein for discharging the stringing material onto the candies carried by said conveyor, a feed pipe for supplying the stringing material to said receptacle, a jacket surrounding a portion of said pipe, and means for supplying both a heating and a cooling medium to said jacket to accurately control the temperature at which the stringing material is discharged from said pipe.

3. A machine of the class described, including in combination, a conveyor for candies, a stringing attachment comprising an elongated receptacle for the stringing material movable transversely above said conveyor and having a plurality of discharge apertures in the bottom thereof, an agitator in said receptacle, a fixed supply-pipe having a hollow swivel connection at one end thereof and an oscillating pipe connected thereto and communicating with said movable receptacle, a jacket surrounding said supply pipe and means for supplying both a heating and a cooling medium to said jacket to accurately control the temperature at which the stringing material is fed to said receptacle.

4. A machine of the class described including in combination, a conveyor for the candies, a thin sheet metal receptacle of U-shaped cross section for the stringing material having a plurality of discharge apertures in the bottom thereof, means for slidably supporting said receptacle, an agitator in said receptacle carried on a shaft passing through the end walls of said receptacle and mounted in bearings fixed to the frame of the machine and a cam carried by said shaft for reciprocating said receptacle.

In witness whereof, I have hereunto signed my name.

JOHN DILGER.